United States Patent Office 3,344,823
Patented Oct. 3, 1967

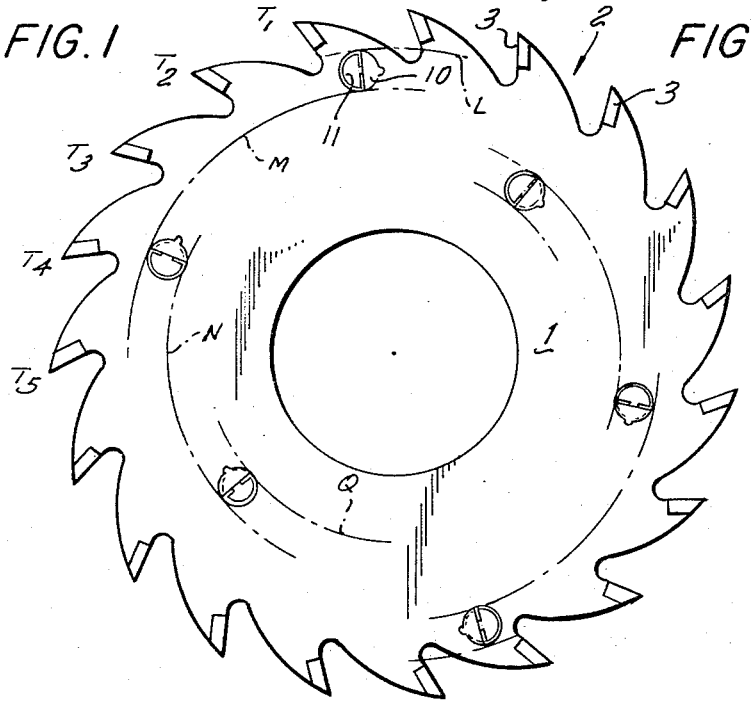
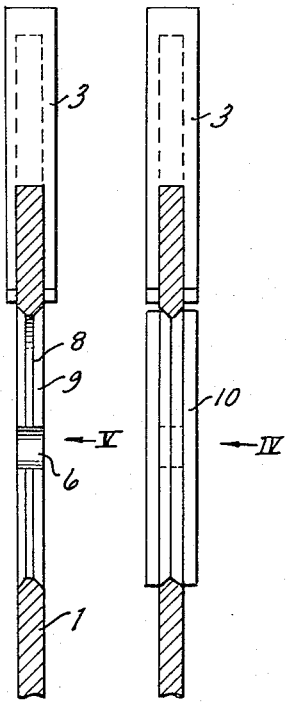
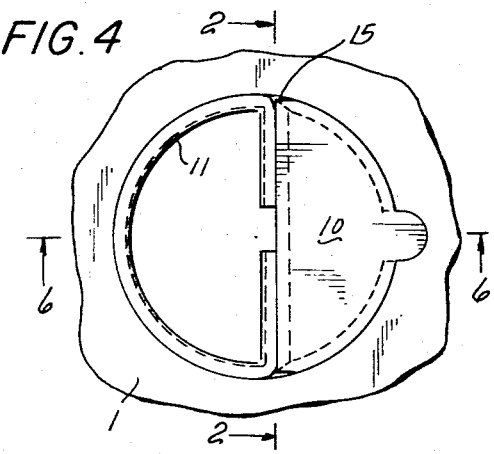
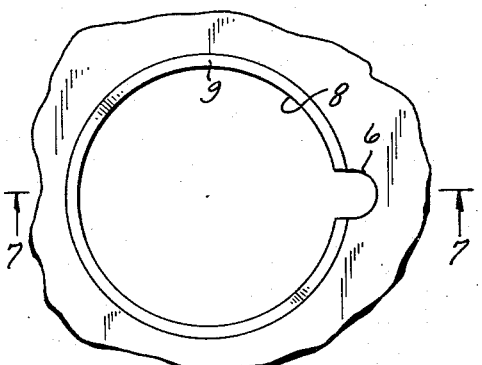
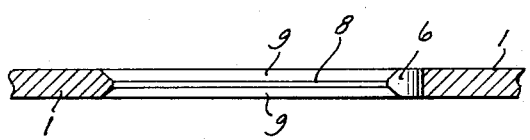
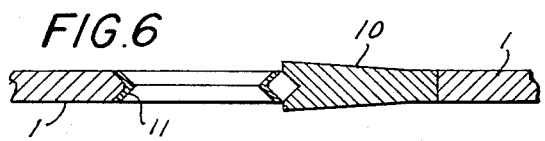

3,344,823
EDGER SAW
Arthur H. Demsky, 6631A NE. Hancock Court,
Portland, Oreg. 97213
Filed Sept. 24, 1965, Ser. No. 489,894
6 Claims. (Cl. 143—140)

This invention relates to edger saws, or saws having planing cutters for smoothing the cut surface of the wood.

It is the general object of the invention to provide a saw of the type indicated in which the machining of the saw disk is reduced to a minimum and in which the planing cutters are readily replaceable and interchangeable.

A saw embodying the invention in a preferred form will now first be described with reference to the accompanying drawing and the features forming the invention will then be pointed out in the appended claims.

In the drawing, FIG. 1 is a face elevational view of the saw; FIG. 2 is a fragmentary radial section, much enlarged, taken on the line 2—2 of FIGS. 1 and 4; FIG. 3 is a view like FIG. 2, but with a planing cutter element removed; FIGS. 4 and 5 are fragmentary face elevational views, to the scale of FIGS. 2 and 3, and looking in the direction of the respective arrows iv and v of those figures; and FIGS. 6 and 7 are, respectively, sections on the lines 6—6 and 7—7 of FIGS. 4 and 5.

The disc saw blank 1 (FIG. 1) is formed with peripheral notches 2, the back edges of which are fitted with tungsten carbide or other durable cutting teeth elements 3. The invention is applicable to saws having any usual number of teeth and to saws in which the teeth comprise two or more sets, with the sets differing from each as to configuration or as to radial or axial extent. In the saw shown, the notches 2 and cutters 3 form similar teeth T1, T2, etc., there being sixteen such teeth. As is evident, as the rotating saw is moved into the wood (or vice versa) the path of each tooth tip is a spiral arc and the cut surface is not truly planar but is ridged in a spiral pattern corresponding to the spiral parallel paths traced by the teeth. This is an unavoidable result of the confinement of the lateral cutting edges of the teeth T1, etc., to the comparatively narrow annular strip between the tip circle of the teeth and the root circle L of the cutters 3.

In the saw of the present invention, the disc 1 is apertured and takes replaceable planing cutter elements which greatly widen the area of the annular strip over which wood is removed and produce a smooth cut surface in which the spiral tooth traces may be substantially completely removed. Preferably, the planing is done by several (three, in the embodiment shown) symmetrical pairs of cutters, each pair being balanced about the saw rotary axis and the several pairs each planing a narrow strip and combining to span a wide annular strip.

While the apertures or other holding means for the cutters may be varied and formed in various ways without departing from the invention in its broader aspect, it is preferred to use cutter-holding apertures of a simple form which can be produced by mere drilling and countersinking operations, permitting the utmost accuracy of location at low cost and without objectionable effect upon the disc metal.

Each of the apertures (FIG. 5) is substantially circular (as at 8) with an approximately semicircular notch (6) at one side, and with its wall (apart from the notch 6) having a triangular or ridge shape, made up of a narrow cylindrical central strip 8 flanked by conical flanks 9. As will be evident, an otherwise completed saw disc may have the apertures formed in it by first drilling circles concentric with the small semicircles 6, followed by the drilling of the larger circles 8, using appropriate counter-sinks to form the flanks to a convenient cone (45°, as shown). The drilling of all apertures may be done while the disc remains on a suitable arbor or rotary support, being indexed 180° between apertures of a pair and 60° between pairs. (Where a different number of pairs of planing cutters is used, the second indexing angle is varied accordingly.)

Referring now to FIG. 1, it will be noted that a pair of radially outermost planing cutters are provided just behind the opposite pair of teeth T1 and T9, a pair of radially intermediate planing cutters is provided 60° ahead of the first pair (and just ahead of the opposite pair of teeth T3 and T11), and a pair of radially innermost planing cutters is provided 120° ahead of the first pair (and almost in the radial plane of the opposite pair of teeth T6 and T14). The radially outermost planing cutters span the interval between the root circle L of the tooth cutters 3 and a concentric circle M. The next pair of planing cutters span from circle M to an inner circle N, while the third pair spans the interval from circle O to the innermost circle O. A fourth or fifth pair of planing cutters may be provided, where required, and less than three pairs may be used. In general, it is preferred to have the radial distance between the successive concentric circles L, M, etc., about one half inch. This gives a convenient size of cutter and cutter holding elements, and does not weaken the saw disc appreciably. As is apparent, the minimum amount of metal removal is had where the radial distance between innermost edge and outermost edge of the planing cutters is divided between a maximum number of small cutters. However, convenience of manufacture and handling of the planing cutters dictates a reasonably large aperture, and a half to three-quarters of an inch will be found convenient in most applications.

The planing cutter 10 is approximately semicircular, having widened diametral cutting edges 12 and being grooved all around as at 13. The groove has its walls at 90° and fits the flanks 9 of the aperture wall. Keeper 11 holds the cutter 10 removably in place, jamming it against the side of the aperture in which the recess 6 is formed. The pressure of the wood as the cutting takes place also tends to force the cutter in this same direction. A semicircular bump 14 is formed on the side of the cutter 10 and fits the recess 6 so as to hold the cutter against turning movement in the plane of the saw. The cutter occupies slightly less than half of the opening 8 and is relieved as at 15, at both ends of the chord of the cutting edges. In consequence, when the keeper 11 is removed, the cutter 10 may be moved over so as to clear it from the inner limit 8 of the aperture wall, so that the cutter can be removed.

The keeper 11 is D-shaped and is formed by bending a piece of spring strip which has the cross-sectional form of a 90° angle. In place, the spring 11 holds the cutter 10 in position, as shown. By squeezing the legs of the D together, the keeper 11 is readily removed and replaced, thus providing for ready removal and replacement of the cutter 10.

As will be observed the cutters 10 and keepers 11 are all the same and are interchangeable, providing a very economical and convenient construction.

What is claimed is:

1. An edger saw comprising a saw disk having peripheral teeth and a plurality of apertures positioned radially inward of the saw teeth, a planing cutter fitting in each such aperture and a spring keeper element holding said planing cutter in place in its aperture, said apertures, being substantially circular and the planing cutters and keepers being substantially semicircular.

2. An edger saw according to claim 1, in which the apertures have recesses in their walls and the planing cutters have projections fitting the recesses and preventing the planing cutters from turning in the plane of the saw disk.

3. An edger saw according to claim 2, in which the aperture walls are countersunk to form ridges and the planing cutters and keepers are correspondingly grooved so as to fit the said ridges and hold the cutters and keepers against movement transversely of the plane of the saw disk.

4. An edger saw according to claim 3, in which the keepers comprise strips of angle-sectioned spring metal bent into a D-shape with the concave side of the angle outermost.

5. An edger saw according to claim 4, in which the apertures and cutters held therein comprise a plurality of pairs, each such pair being arranged symmetrically about the saw axis of rotation and the different pairs being spaced at radially different distances from the said axis, whereby they cooperate to plane an annular strip having a multiple of the width of cut of a single such planing cutter.

6. An edger saw according to claim 5, in which the said pairs plane concentric overlapping annular strips.

References Cited

UNITED STATES PATENTS

| | | | |
|---|---|---|---|
| 211,029 | 12/1878 | Luce | 143—152 X |
| 342,535 | 5/1886 | Perkins | 143—143 |

DONALD R. SCHRAN, *Primary Examiner.*